US007950059B2

(12) United States Patent
Aharon et al.

(10) Patent No.: US 7,950,059 B2
(45) Date of Patent: May 24, 2011

(54) UNIVERSAL WORM CATCHER

(75) Inventors: Leeor Aharon, Tel Aviv (IL); Cfir Cohen, Ramat Hasharon (IL)

(73) Assignee: Check-Point Software Technologies Ltd., Ramat Gan (IL)

( * ) Notice: Subject to any disclaimer, the term of this patent is extended or adjusted under 35 U.S.C. 154(b) by 982 days.

(21) Appl. No.: 10/577,860

(22) PCT Filed: Nov. 18, 2004

(86) PCT No.: PCT/IL2004/001066
§ 371 (c)(1),
(2), (4) Date: Apr. 28, 2006

(87) PCT Pub. No.: WO2005/062707
PCT Pub. Date: Jul. 14, 2005

(65) Prior Publication Data
US 2007/0089171 A1   Apr. 19, 2007

(51) Int. Cl.
G08B 23/00 (2006.01)
(52) U.S. Cl. ............................................ 726/24; 726/22
(58) Field of Classification Search .................. None
See application file for complete search history.

(56) References Cited

U.S. PATENT DOCUMENTS

| 5,319,776 A | | 6/1994 | Hile | |
|---|---|---|---|---|
| 5,414,833 A | | 5/1995 | Hershey | |
| 5,842,002 A | | 11/1998 | Schnurer | |
| 6,014,513 A | * | 1/2000 | Voelker et al. | 717/131 |
| 6,092,194 A | * | 7/2000 | Touboul | 726/24 |
| 6,119,236 A | * | 9/2000 | Shipley | 726/22 |
| 6,301,699 B1 | | 10/2001 | Hollander | |
| 6,775,780 B1 | * | 8/2004 | Muttik | 726/24 |
| 7,293,290 B2 | * | 11/2007 | Szor | 726/24 |
| 7,334,262 B2 | * | 2/2008 | Szor | 726/22 |
| 7,389,540 B2 | * | 6/2008 | Radatti et al. | 726/24 |
| 7,702,806 B2 | * | 4/2010 | Gil et al. | 709/234 |
| 2002/0056076 A1 | * | 5/2002 | Made | 717/129 |

(Continued)

FOREIGN PATENT DOCUMENTS
WO    WO98/14872    4/1998

OTHER PUBLICATIONS

Schmall, Markus Classification and identification of malicious code based on heuristic techniques utilizing Meta languages Dissertation : Hamburg, Univ., Informatik, 2002 URN (NBN) : urn:nbn:de:gbv:18-10934.*

*Primary Examiner* — David J Pearson
(74) *Attorney, Agent, or Firm* — Mark M. Friedman

(57) ABSTRACT

A method for detecting malicious code in a stream of data traffic input (400) to a gateway in a data network by monitoring for suspicious data in the stream of data traffic (407). Upon detecting the suspicious data, an attempt is made to disassemble the suspicious data (403) and a treat weight is assigned for each instruction. The attempt to disassemble is initiated at initial instructions each with a different offset within the suspicious portion of data. The threat weights are accumulated respectively for each branch option in the disassembled code (403), producing respectively an accumulated threat weight for each branch option. When the accumulated threat weight exceeds a previously defined threshold level, an alert is generated and/or traffic is blocked from the source of the malicious code.

25 Claims, 5 Drawing Sheets

U.S. PATENT DOCUMENTS

| | | |
|---|---|---|
| 2002/0066024 A1 | 5/2002 | Schmall |
| 2002/0073323 A1 | 6/2002 | Jordan |
| 2002/0073330 A1 | 6/2002 | Chandnani |
| 2002/0078368 A1 | 6/2002 | Yann |
| 2002/0091934 A1 | 7/2002 | Jordan |
| 2002/0144156 A1* | 10/2002 | Copeland, III ............... 713/201 |
| 2003/0196095 A1 | 10/2003 | Jeffries |
| 2003/0212913 A1* | 11/2003 | Vella .............................. 713/202 |
| 2004/0015712 A1* | 1/2004 | Szor .............................. 713/200 |
| 2004/0064537 A1* | 4/2004 | Anderson et al. ............. 709/223 |

* cited by examiner

UNIVERSAL WORM CATCHER

FIELD AND BACKGROUND OF THE INVENTION

The present invention relates to protection of networks and, more particularly, to a system and method for detecting malicious code in a stream of data, such as in a gateway to a data network.

Network attacks include both "worm" attacks and "virus" attacks. A virus attack is performed typically during an expected transfer of executable code. The virus bearing code is attached to the executable code. Virus attacks are prevented by anti-virus software that is signature-based. Typically, anti-virus software interacts with a database of known viruses that includes virus signatures. A virus signature is typically one or more instructions or data known to be included in the code bearing the virus. Anti-virus software is used to scan executable code and search for virus' signatures during or just subsequent to transfer. Anti-virus software is therefore reactive only to known threats and unable to protect against new and/or unknown threats. A worm attack is a network attack based on sending malicious code over parts of network connections where code is not expected such as during data transfer of non-executable code, e.g. while browsing the Internet. An application, running on targeted computers receiving the code, is tricked into executing the malicious code using known weaknesses in the operating system and/or in the application running on the targeted computer. New worms usually spread much faster than new viruses and as a result the signature-based method is too slow. Consequently, detection of a worm attack requires a different approach from anti-virus scanning.

Worm attacks that exploit a vulnerability known as an overflow are particularly common. Buffer overflows and their more recent variations, heap overflows and integer overflows, are a common form of security threat in software systems. Vulnerabilities attributed to overflows have increasingly dominated all computer vulnerabilities with over 50% of security advisories issued in the year 2003 relating to buffer overflows alone. Recent contagious computer worms include Slammer, Blaster and Welchia, all exploiting buffer overflow vulnerabilities, inflicting billions of dollars worth of damages on the computing community. An effective solution to malicious code detection will significantly improve the security of a networked computing systems.

There is considerable prior art in the field of detecting worms and viruses. The prior art teaches three ways to detect worms and viruses as follows (1) Scanning: The scanning method includes detection of malicious code by scanning network messages for strings, e.g. signatures, which are previously known to occur in malicious code. Prior art references representative of this method to detect malicious code include, Hile et al. U.S. Pat. No. 5,319,776, Hershey et al. U.S. Pat. No. 5,414,833, and Judge et al., US patent application 2003/0196095.

(2) Emulation: Emulation method for detection of viruses in particular, includes executing the code in an isolated environment so that no damage occurs if the code turns out to be malicious. Emulation methods monitor in the isolated environment for behavior symptomatic of infection by malicious code. Prior art references that teach emulation methods include Schnurer et al., U.S. Pat. No. 5,842,002, Jordan US patent application 2002/0073323, Yann et al., US patent application 2002/0078368 and Jordan, US patent application 2002/0091934.

(3) Semantic analysis: The method includes analyzing the code to predict without actually executing the code whether the code is malicious. Prior art references that teach this method include Hollander et al. U.S. Pat. No. 6,301,699, Chen international patent application WO98/14872, Schmall et al. US2002/0066024 and Chandnani et al., US patent application 2002/0073330. Chen WO98/14872, teaches a method for detecting and removing viruses in macros. A macro virus-scanning module detects unknown macro virus' signatures by obtaining comparison data that includes sets of instruction identifiers from a virus information module.

Reference is now made to FIG. 1 showing a simplified prior art data network including a wide area network (WAN) 111 attached to a local area network (LAN) 115 through a gateway 101. Attached to WAN 111 is a malicious client 105b, the user of malicious client is attempting to exploit, for instance, a buffer overflow vulnerability in either client machine 105a and/or application server 113 in LAN 115.

Hollander et al. U.S. Pat. No. 6,301,699 is directed towards a semantic analysis method to detect an attempt to obtain super-user privileges in a computer by passing a binary string as a function parameter thereby causing a buffer overflow. Hollander et al. '699 teach disassembling the string and following possible execution paths of the resulting code to find invalid targets of jump instructions as well as system calls. Hollander et al. '699 teach a method to detect buffer overflow exploitations in progress in application server 113 or client machine 105a.

None of the prior art references teach a semantic analysis method for detecting malicious code in a stream of data, for instance at a gateway 101 of local area network 115. Detection of malicious code at the network level in a stream of data is done before forwarding the code to the target of the attack, e.g application server 113 or client machine 105a. Often internal client machine 105a can not be attacked directly by an external client machine 105b, however using a technique known as cross site scripting, attacking client machine 105b can install an attacking code in internal application server 113 and subsequently internal client machine 105a is tricked to load the attacking code.

There is thus a need for, and it would be highly advantageous to have, a system and method for detection of malicious code in a stream of data offering protection from malicious code at the network level.

SUMMARY OF THE INVENTION

According to the present invention there is provided a method for detecting malicious code in a stream of data traffic input to a gateway of a data network, the method includes monitoring by the gateway for a suspicious portion of data in the stream of data traffic. Upon detecting the suspicious portion of data, attempting to disassemble the suspicious portion thereby attempting to produce disassembled code. For each instruction in the disassembled code, a threat weight is assigned. The threat weight is accumulated for each instruction in the disassembled code, thereby producing an accumulated threat weight. Preferably, the suspicious portion of data contains an illegal character in the protocol of the stream of data traffic. Preferably, the monitoring is performed by skipping acceptable data in the stream of data traffic, said acceptable data consistent with a protocol used by the data stream. Preferably, the acceptable data includes acceptable executable code. Preferably, upon reaching a branch in the disassembled code, further accumulating respectively for each branch option, thereby producing the accumulated threat weight for each branch option. Preferably, upon the accumulated threat weight exceeding a previously defined threshold level, an action is performed, either generating an alert, and/or blocking traffic from the source of the malicious code. Preferably, the blocking is solely in the stream of data traffic. Preferably, the attempting to disassemble is initiated at a plurality of initial instructions, each of the initial instructions with a different offset within the suspicious data, and the threat weight is accumulated respectively for each offset. Preferably, the attempting to disassemble is initiated at an initial instruction of an address of previously known offset relative to a vulnerable return address. Preferably, wherein the stream of data traffic includes an encoded data portion, the method includes decoding the encoded data portion, prior to attempting to disassemble the stream of data.

According to the present invention, there is provided a method for detecting malicious code in a stream of data traffic input to a gateway of a data network, the stream of data traffic including data packets, the method including: (a) monitoring by the gateway for a suspicious portion of data in the stream of data traffic; (b) upon detecting the suspicious portion of data, attempting to disassemble the suspicious data thereby attempting to produce disassembled code. For each instruction in the disassembled code, assigning respectively a threat weight for each instruction and accumulating the threat weight to produce an accumulated threat weight. The threat weight for each said instruction is selectively either increased for a legal instruction, and or decreased for an illegal instruction. Preferably, the attempting to disassemble is initiated at a plurality of initial instructions, each of the initial instructions with a different offset within the suspicious data, and the threat weight is accumulated respectively for each offset. Preferably, the attempting to disassemble is initiated at an initial instruction of an address of previously known offset relative to a vulnerable return address. Preferably, the method further includes receiving the packets input from a wide area network interface of the gateway, thereby building the packets into a virtual stream inside the gateway; and (d) upon the accumulated threat weight exceeding a previously defined threshold level, performing an action either (i) generating an alert, and/or (ii) blocking traffic from the source of the malicious code.

According to the present invention there is provided a stream of data traffic purged of malicious code, according to the methods as described herein. According to the present invention there is provided a program storage device readable by a machine, tangibly embodying a program of instructions executable by the machine to perform a method for detecting malicious code in a stream of data traffic in a data network as described herein.

According to the present invention there is provided a computer system including a processor, and a program storage device readable by a machine, tangibly embodying a program of instructions executable by the machine to perform a method for detecting malicious code in a stream of data traffic in a data network, the method including: (i) monitoring by the gateway for at least one suspicious portion of data in the stream of data traffic; (ii) upon detecting the suspicious portion of data, attempting to disassemble the suspicious portion thereby producing disassembled code; (iii) for each instruction in the disassembled code, assigning respectively a threat weight for each instruction; and iv) accumulating the threat weight in the disassembled code, thereby producing an accumulated threat weight. The threat weight for each instruction is selectively either increased for a legal instruction, and/or decreased for an illegal instruction. Preferably, the attempting to disassemble is initiated at an initial instruction of an address of previously known offset relative to a vulnerable return address.

According to the present invention there is provided an apparatus for detecting malicious code in a stream of data traffic input to a gateway to data network, the apparatus including (a) a filter apparatus which filters and thereby detects suspicious data in the stream of data traffic; (b) a disassembler attempting to convert binary operation codes of the suspicious data into assembly instructions, thereby attempting to produce disassembled code; and (c) an assembly instructions analyzer which for each of the instructions assigns respectively a threat weight, accumulates respectively the threat weight, thereby produces an accumulated threat weight. Preferably, the conversion is initiated at an initial instruction of different offset within the suspicious data, and the threat weight is accumulated respectively for each offset. Preferably, the apparatus further includes a vulnerable return address detector, which detects an initial instruction for the attempt to convert binary operation codes to produce disassembled code.

BRIEF DESCRIPTION OF THE DRAWINGS

The invention is herein described, by way of example only, with reference to the accompanying drawings, wherein.

DESCRIPTION OF THE PREFERRED EMBODIMENTS

Figure 1:
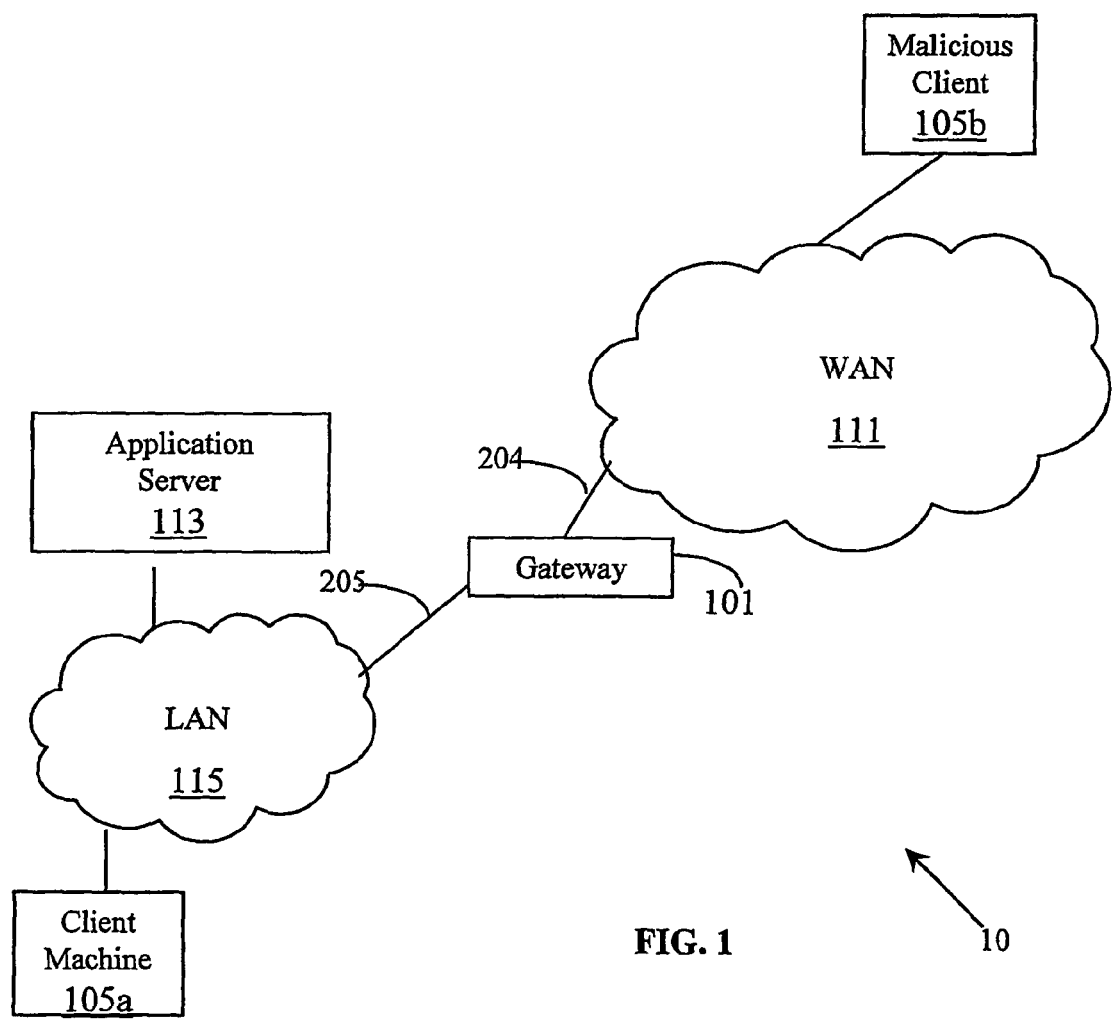
FIG. 1 (prior art) is a simplified schematic drawing of a data network with a gateway to a local area network.

The present invention is of a system and method for providing protection at the network level by detecting malicious code in a stream of data.

The principles and operation of a system and method for detecting malicious code in a stream of data, according to the present invention, may be better understood with reference to the drawings and the accompanying description.

Before explaining embodiments of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

As such, those skilled in the art will appreciate that the conception, upon which this disclosure is based, may readily be utilized as a basis for the designing of other methods and systems for carrying out the several purposes of the present invention. It is important, therefore, that the claims be regarded as including such equivalent constructions insofar as they do not depart from the spirit and scope of the present invention.

By way of introduction, principal intentions of the present invention are to: (1) detect and block network traffic in a stream of data traffic that are suspected to contain malicious code; (2) provide generic protection without requiring a previously defined signature for every malicious code and therefore provide protection for an unknown "worm"; (3) block traffic preventing the malicious code from reaching its destination; (4) provide detection in a central location (e.g in network gateway 101) eliminating the need to install protection software on each client machine 105a and each server, e.g. application server 113. A stream of data traffic refers herein to data traffic including combined non-executable code, i.e. HTML and executable code in HTTP traffic. Preferably, the stream of data traffic contains protocol parameters, user entered text, text messages and/or pictures as well as other binary information. The stream of data traffic typically also includes legitimate executable code, for instance, as a download of software over the Internet.

An intention of the present invention is to distinguish malicious executable code from all other data in the stream of data traffic. In general, detection of malicious executable code requires an attempt to disassemble any suspicious data in the data stream. A portion of data in the stream of data is deemed suspicious if the portion of data includes for instance one or more characters illegal in a protocol of the stream of data. The term "suspicious" data as defined herein to include one or more illegal characters in a protocol of the stream of data. The term "acceptable" data is defined herein as data which is not suspicious and therefore does not contain any illegal characters in a protocol of the stream of data.

In general, successful disassembly of data requires prior knowledge where in the data to begin the disassembly process. In a stream of data traffic, for instance at gateway 101, there is no prior knowledge of where to begin disassembly. To overcome this lack of knowledge, according to an embodiment of the present invention, a disassembly is attempted beginning at many different offsets within the suspicious data.

Figure 2:
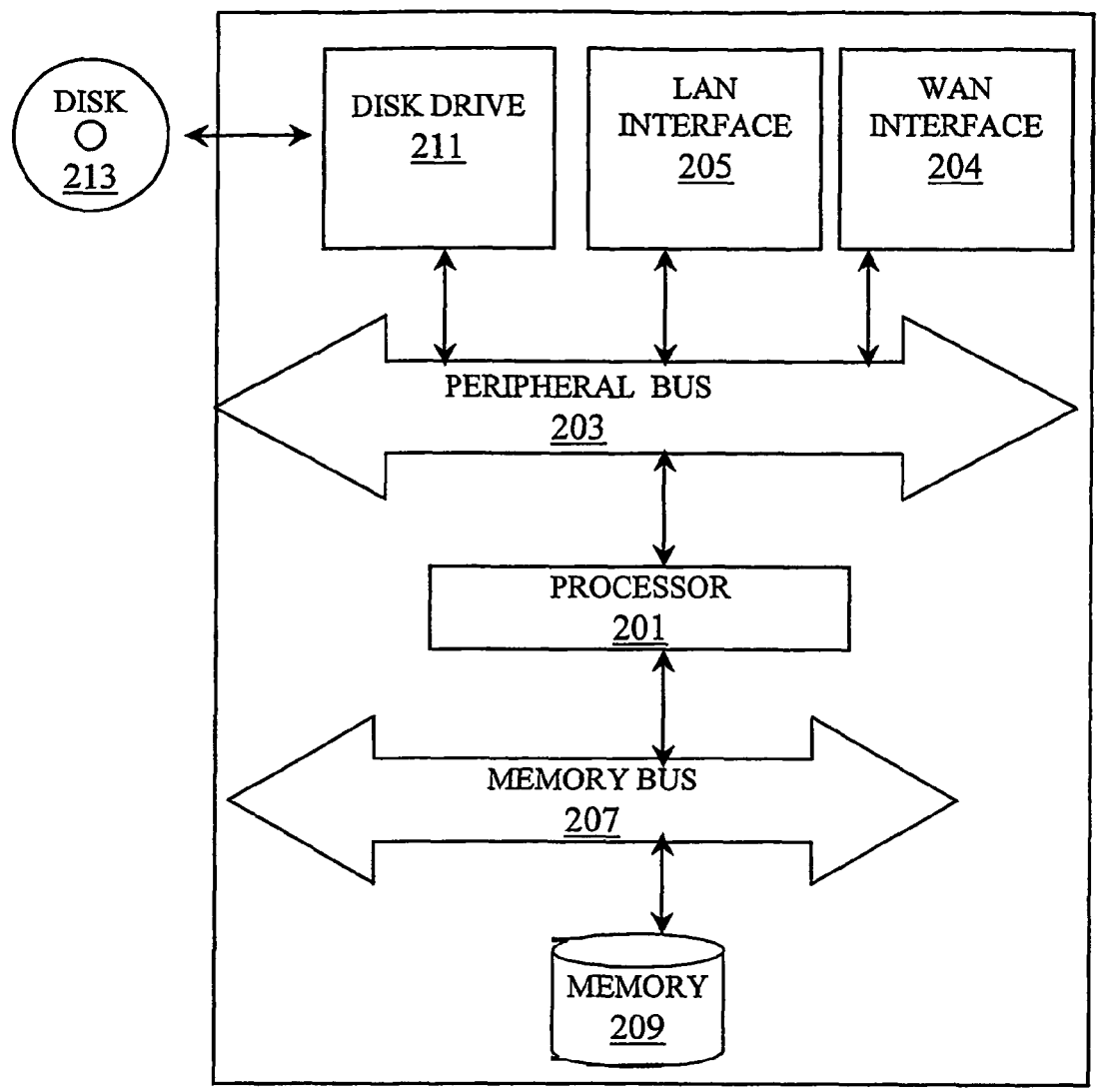
FIG. 2 (prior art) is a simplified drawing of a computer, programmable for malicious code detection according to an embodiment of the present invention.

Referring now to the drawings, FIG. 2 illustrates a computer, for instance gateway 101, which includes a processor 201, a storage mechanism including a memory bus 207 to store information in memory 209 and a WAN interface 204 and LAN interface 205, each operatively connected to processor 201 with a peripheral bus 203. Gateway 101 further includes a data input mechanism 211, e.g. disk drive from a program storage device 213, e.g. optical disk. Data input mechanism 211 is operatively connected to processor 201 with a peripheral bus 203.

Figure 3:
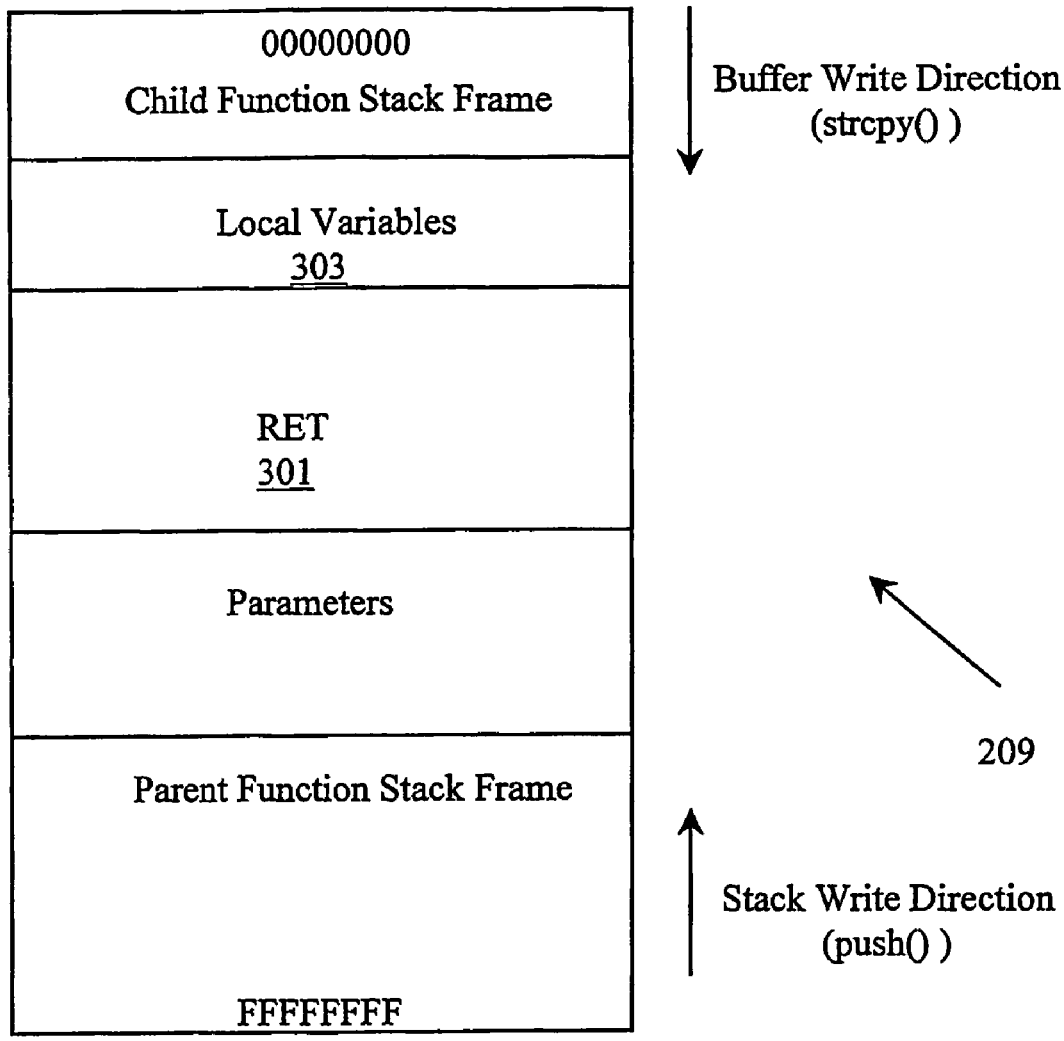
FIG. 3 (prior art) is a chart of a typical memory structure of a computer vulnerable to a buffer overflow attack, the attack detectable at the network level according to an embodiment of the present invention.

FIG. 3 illustrates a typical structure of memory 209, i.e. using a stack, when a parent function calls a child function. A stack is a memory structure of contiguous memory addresses starting from: a high memory location, e.g. FFFF (hexadecimal). Stack-write operations, e.g. push, advance the stack pointer to lower memory addresses. A stack pointer points to the top of the stack, i.e. the next available address in the stack A buffer typically starts at low memory location, e.g. 0000, and includes local variables 303 of the child function. Buffer write operations, i.e. memcpy( ), strcpy( ) use higher memory locations. When a parent function calls the child function, typically the return address 301 (RET) of the parent function is pushed onto the stack. The stack pointer (ESP) points directly at the saved return address, waiting for a RET instruction in the child application. Child function's local variables 303 are allocated in a buffer above the stack, i.e. further down in memory. In case of a buffer overflow an attacker prepares an attacking message and places the attacking message in the stream of data in such a way that the attacking message is copied into the local buffer of limited size. With buffer overflow, it is possible to overwrite RET address 301. Overwriting RET address 301 causes the application to return to a return address supplied by the attacker. A "well designed" return address will cause the application to jump to the attacker-supplied message, thus executing the attacker's code. Therefore the attacking message typically contains executable code and contains a mechanism that forces execution of the code.

In Unix (Linux/Solaris) platforms, the exact location of the stack in memory is known in advance to the attacker and therefore the attacker knows in advance the return address. A buffer overflow attack on a Unix platform uses a hard coded RET address that points to the stack address of the attacker's code. In contrast on Windows® platforms, the location of the stack base address is not fixed and may vary between processes. Application modules of the operating system (e.g., kernel32.dll) are loaded into known memory locations, i.e. same virtual addresses. A buffer overflow attack will set RET value 301 to point to the malicious code at a known address of one of the loaded applications modules where the instruction "CALL ESP", (operation code FF D4) is found. Since the stack pointer (ESP) points to the attacker's buffer, the RET instruction executes the attacker's code. A generic detector for malicious code for Windows® platforms can search for a "vulnerable return address", one of the addresses of known memory locations, e.g. where Windows® supplies the operation code FF D4. The detector of the "vulnerable return address" maintains all known return addresses or keeps an image of a Windows® operating system and checks where in the Windows® operating system is the return address pointing.

Figure 4:
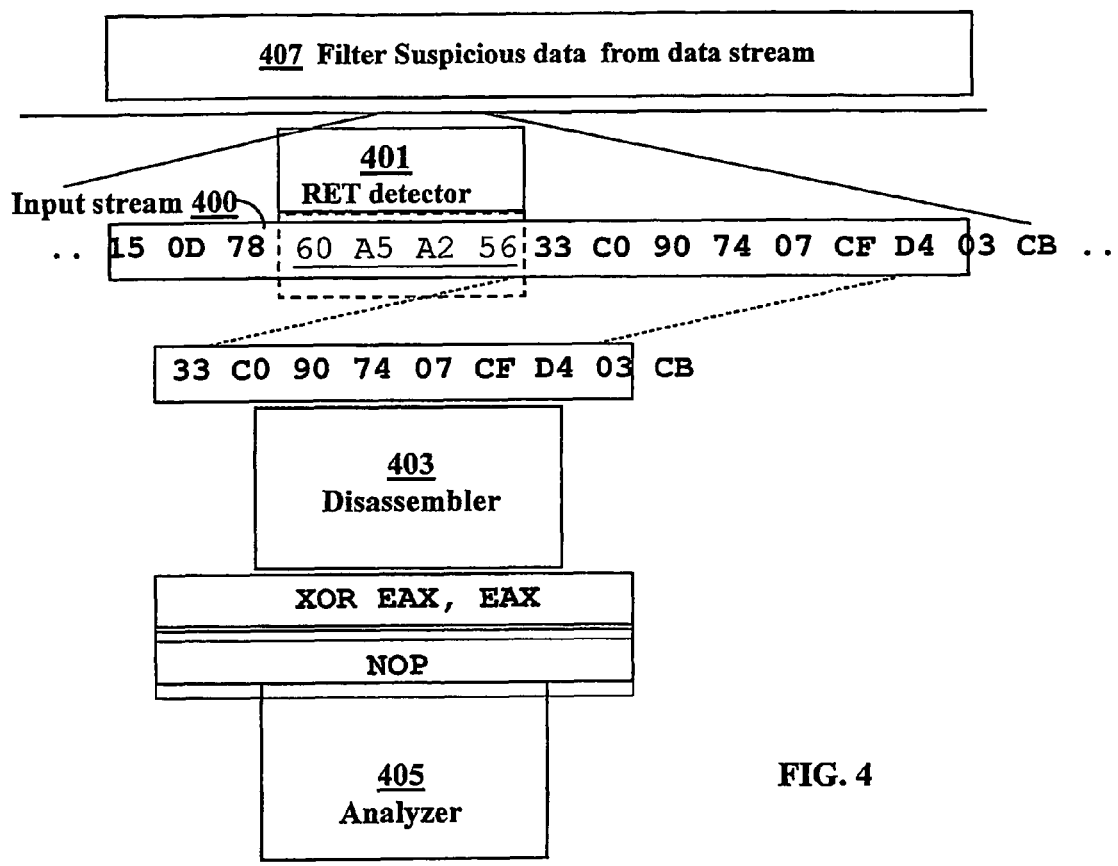
FIG. 4 shows the main software modules for malicious code detection, according to an embodiment of the present invention.

A detection of a "Vulnerable return address" is not necessarily an indication of malicious code; to verify the detection of malicious code, it is needed to disassemble the code that immediately follows the "vulnerable return address", or otherwise at a previously known offset relative to the "vulnerable return address". Reference is now made to FIG. 4, illustrating software modules according to in embodiment of the present invention. An input data stream of data is input into a filter module 407 that monitors and detects suspicious data. The input data stream is inputted into filter module 407 by reading the content of data packets passing through gateway 101 and building a copy of the passing stream (i.e. virtual stream). The copy is then directed to filter module 407. Alternatively an application proxy on gateway 101 copies an incoming stream to an outgoing stream sends a copy of the stream to filter module 407. Suspicious data includes data inconsistent with the protocol in use. For instance, an illegal character is filtered out of a stream of data traffic, e.g. HTTP traffic. The illegal character is unexpected as part of the protocol definition in the input data stream. Another option of such filtering is to treat all parts of the protocol as suspicious except for parts of the protocol that were specifically marked by the protocol to contain executable code. For example, an URL of an HTTP request is suspicious since any executable code segment found within it will constitute a worm. The suspicious stream of data is preferably input first to a vulnerable return address detector 401. If a vulnerable return address is detected, the code in the input stream subsequent to, or at a previously known relative offset from the vulnerable return address, is disassembled by disassembler 403. In the example of FIG. 4, the input data stream includes executable code with a vulnerable return address:
60 A5 A2 56
The data following the vulnerable return address is:
33 C0 90 74 07 CF D4 03 CB
The data as shown above is disassembled by disassembler 403 to the following instructions:
XOR EAX,EAX
NOP Subsequent to disassembly, an instruction analyzer 405 is used to determine if the code is executable code and malicious.

In the example of FIG. 4, it is clear where the code starts, i.e. after a vulnerable return address. However, in case a vulnerable return address is not detected, and without any advance knowledge regarding any other execution mechanism the attacker is attempting to use, then in order to perform a disassembly and analyze the input stream for malicious code, instruction analyzer 405 needs to perform a disassembly within the suspicious data staring from every possible offset.

Figure 5:
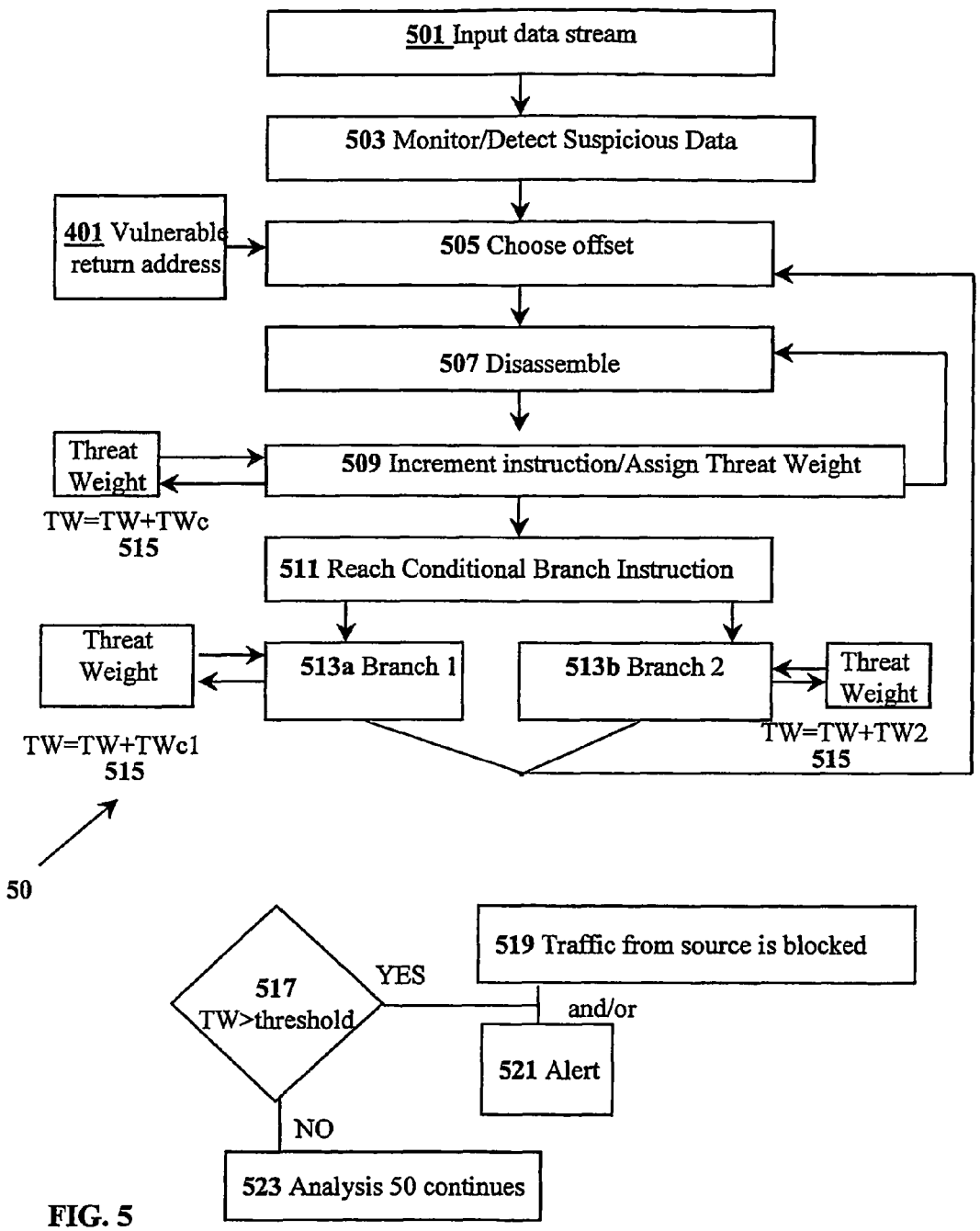
FIG. 5 is a flow chart of a method for malicious code detection according to an embodiment of the present invention.

Reference is now made to FIG. 5, a flow diagram for an analysis method 50. A data stream is input (step 501) preferably to gateway 101 programmed according to analysis method 50. In analysis method 50, filter 407 monitors (step 503) for suspicious data. An example of suspicious data in hypertext transfer protocol (HTTP) including an URL (Uniform Resource Locator) containing a character which is not allowed. If a vulnerable return address is detected by detector 401 then the address for starting the disassembly is known, e.g. just after vulnerable return address. Otherwise, instruction analyzer 405 chooses (step 505) an offset for example, by enumerating over all possible offsets, and attempts to disassemble (step 507) the data of the input stream subsequent to the chosen offset. The instruction is incremented (step 509) and each instruction is disassembled (step 507) until a branch (or conditional branch) instruction is reached (step 511). For each instruction, between the chosen offset and a branch instruction a threat weight is thus calculated and accumulated (step 515). Another offset is then chosen (step 505), instructions are disassembled (step 507) and incremented (step 509) and a threat weight is accumulated and added to the accumulated value up to the branch point (step 515). The input stream including executable code is analyzed by dividing the executable code into "flows" including all instructions between the chosen offset (or a first branch instruction) and a subsequent branch instruction. Every time a conditional jump instruction is reached (step 511) the conditional branch instruction is disassembled (step 507) the flow is split into two flows in branch options 513a and 513b, each branch continuing in a different execution path. As a result the flows are linked into "spiders" containing a list (or tree) of flows. For each flow, a threat weight is maintained in memory and accumulated (step 515) and as the flow progresses its threat-weight is updated.

The threat weight of a "spider" is equal to the sum the threat weights of the respective "flows". Different "flows" in the same "spider" can communicate with each other. In case a first "flow" encounters an invalid-instruction, the first "flow" can "tell" the other flows in the same "spider" about the invalid instruction, and the other flows in turn, will decrease the respective threat-weights.

Threat weight is calculated by instruction analyzer 405, according to an embodiment of the present invention by set of rules. For instance, invalid instruction (data that is not executable code) will decrease the threat weight by a given amount. For example, for Windows® running on Intel's Pentium, illegal instructions include:
IN 64
ARPL
Uncommon instructions also decrease the threat weight by a given amount. Uncommon instructions include:
DAA
SHAF
Instructions that access memory in an invalid way decrease the threat weight, such as:
MOV [00000044], EAX
ADD [EBX+12345678], ECX (when EBX is not initialized)
Valid instructions increase the threat weight. Specific instructions (or set of instructions) that are likely to appear in the initialization code of a worm attack will greatly increase the threat weight. For example in Windows®, the attacker does not know in advance at which absolute address the attacking code will be executed. In order to determine the absolute address the attacker can load the address (EIP) in runtime into a register (EBP) using the following sequence (the known "call delta" technique)
1: CALL 2 // Perform a function call to the code that starts at an offset of 2 bytes, which "happens" to be the next instruction, pushing the current address onto the stack.
2: POP EBP // Pop the stack into the EBP register.
The location of the attacking code location can also be computed from the stack location that can be read through a command such as:
MOV EBP, ESP
The determination of the location of Kernel32.dll is "useful" to a worm for causing damage and self-propagation. The following instruction which is used in Windows® to determine the location of Kernel32.dll, significantly increases the threat weight.
MOV EAX, FS:[30]
In some cases attacking, e.g. worm, code is scrambled in order to hide the attack. When the attacking code is scrambled there must be a descrambling code at the start of the attack. If descrambling code is detected, then the threat weight is increased.

Referring back to FIG. 5, if during analysis 50, the treat weight exceeds a previously determined threshold (decision block 517) then traffic is blocked (step 519) from the source of attack and/or an alert is generated (step 521) to either a supervisor or user. Otherwise analysis 50 of the input data stream continues (step 523).

With respect to the above description then, it is to be realized that the optimum function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact design and operation shown and described, and accordingly, all suitable modifications and equivalents may be resorted to, failing within the scope of the invention.

While the invention has been described with respect to a limited number of embodiments, it will be appreciated that many variations, modifications and other applications of the invention may be made.

What is claimed is:

1. A method for detecting malicious code in a stream of data traffic input to a gateway of a data network, the method comprising the steps of:
   (a) monitoring by the gateway for at least one suspicious portion of data in a portion of the stream of data traffic that is expected to lack executable code;
   (b) upon detecting said at least one suspicious portion of data, attempting to disassemble said at least one suspicious portion of data thereby attempting to produce disassembled executable code; and
   (c) if said attempting to disassemble said at least one suspicious portion of data succeeds in producing disassembled executable code, then: for each instruction in said disassembled executable code:
      (i) assigning respectively a threat weight for each said instruction, and
      (ii) accumulating said threat weight to produce an accumulated threat weight.

2. The method, according to claim 1, wherein said at least one suspicious portion of data contains at least one illegal character in a protocol of the stream of data traffic.

3. The method, according to claim 1, wherein said monitoring is performed by skipping acceptable data in the stream of data traffic, said acceptable data being consistent with a protocol used by the data stream.

4. The method, according to claim 3, wherein said acceptable data includes acceptable executable code.

5. The method, according to claim 1, wherein upon reaching a branch in said disassembled code, further accumulating said threat weight respectively for each branch option in said disassembled code, thereby producing said accumulated threat weight for each said branch option.

6. The method, according to claim 1, further comprising the step of
   (d) upon said accumulated threat weight exceeding a previously defined threshold level, performing an action selected from the group of
      (i) generating an alert, and
      (ii) blocking traffic from the source of the suspicious data.

7. The method, according to claim 6, wherein said blocking is solely in the stream of data traffic.

8. The method, according to claim 1, wherein said attempting to disassemble is initiated at a plurality of initial instructions, each of said initial instructions with a different offset within said at least one suspicious portion of data, and said threat weight is accumulated respectively for each said offset.

9. The method, according to claim 1, wherein said attempting to disassemble is initiated at an initial instruction of an address of previously known offset relative to a vulnerable return address.

10. The method, according to claim 1, wherein the stream of data traffic includes an encoded data portion, further comprising the step of, prior to said attempting to disassemble:
    (d) decoding said encoded data portion.

11. A method for detecting malicious code in a stream of data traffic input to a gateway of a data network the stream of data traffic including data packets, the method comprising the steps of:
    (a) monitoring by the gateway for at least one suspicious portion of data in a portion of the stream of data traffic that is expected to lack executable code;
    (b) upon detecting said at least one suspicious portion of data, attempting to disassemble said suspicious data thereby attempting to produce disassembled executable code; and
    (c) if said attempting to disassemble said at least one suspicious portion of data succeeds in producing disassembled executable code, then: for each instruction in said disassembled executable code:
       (i) assigning respectively a threat weight for each said instruction, and
       (ii) accumulating said threat weight to produce an accumulated threat weight,
       wherein said threat weight for each said instruction is selectively either:
          (A) increased for a legal instruction, and
          (B) decreased for an illegal instruction.

12. The method, according to claim 11, wherein said attempting to disassemble is initiated at a plurality of initial instructions, each of said initial instructions with a different offset within said at least one suspicious portion of data, and said threat weight is accumulated respectively for each said offset.

13. The method, according to claim 11, wherein said attempting to disassemble is initiated at an initial instruction of an address of previously known offset relative to a vulnerable return address.

14. The method, according to claim 11, further comprising the steps of:
    (d) receiving the data packets input from a wide area network interface of the gateway, thereby building the packets into a virtual stream inside the gateway; and
    (e) upon said accumulated threat weight exceeding a previously defined threshold level, performing an action selected from the group of
       (i) generating an alert, and
       (ii) blocking traffic from the source of the malicious code.

15. A program storage device readable by a machine, tangibly embodying a program of instructions executable by the machine to perform a method for detecting malicious code in a stream of data traffic in a data network, the method comprising the steps of:
    (a) monitoring by a gateway of the network for at least one suspicious portion of data in a portion of the stream of data traffic that is expected to lack executable code;
    (b) upon detecting said at least one suspicious portion of data, attempting to disassemble said suspicious data thereby attempting to produce disassembled executable code; and
    (c) if said attempting to disassemble said suspicious data succeeds in producing disassembled executable code, then: for each instruction in said disassembled executable code:
       (i) assigning respectively a threat weight for each said instruction, and
       (ii) accumulating said threat weight to produce an accumulated threat weight,
       wherein said threat weight for each said instruction is selectively either:
          (A) increased for a legal instruction, and
          (B) decreased for an illegal instruction.

16. A computer system comprising,
    (a) a processor;
    (b) a program storage device readable by a machine, tangibly embodying a program of instructions executable by the machine to perform a method for detecting malicious code in a stream of data traffic in a data network, the method including the steps of:
       (i) monitoring by the system for at least one suspicious portion of data in a portion of the stream of data traffic that is expected to lack executable code;

(ii) upon detecting said at least one suspicious portion of data, attempting to disassemble said suspicious data thereby attempting to produce disassembled executable code; and (i) if said attempting to disassemble said suspicious data succeeds in producing disassembled executable code, then: for each instruction in said disassembled executable code:

(A) assigning respectively a threat weight for each said instruction, and (B) accumulating said threat weight to produce an accumulated threat weight, wherein said threat weight for each said instruction is selectively either:

(I) increased for a legal instruction, and (II) decreased for an illegal instruction.

17. The system, according to claim 16, wherein said attempting to disassemble is initiated at a plurality of initial instructions, each of said initial instructions with a different offset within said at least one suspicious portion of data, and said threat weight is accumulated respectively for each offset.

18. The system, according to claim 16, wherein said attempting to disassemble is initiated at an initial instruction of an address of previously known offset relative to a vulnerable return address.

19. An apparatus for detecting malicious code in a stream of data traffic input to a gateway to a data network, the apparatus comprising:

(a) a plurality of software modules, stored on a program storage device, for detecting malicious code, including:

(i) a filter apparatus which filters a portion of the stream of data traffic that is expected to lack executable code and thereby detects at least one suspicious portion of data in the stream of data traffic, (ii) a disassembler attempting to convert binary operation codes into assembly instructions of said at least one suspicious portion of data, thereby attempting to produce disassembled executable code, and (iii) an assembly instructions analyzer which determines whether said attempting to convert binary operation codes into assembly instructions of said at least one suspicious portion of data succeeds in producing disassembled executable code, and then, if said attempting to convert binary operation codes into assembly instructions of said at least one suspicious portion of data succeeds in producing disassembled executable code, for each of said instructions assigns respectively a threat weight, accumulates respectively said threat weight thereby produces an accumulated threat weight; and (b) a processor for executing said software modules.

20. The apparatus, according to claim 19, wherein said attempting to convert is initiated at a plurality of initial instructions, each of said initial instructions with a different offset within said at least one suspicious portion of data, and said threat weight is accumulated respectively for each said offset.

21. The apparatus, according to claim 19, wherein said software modules further include:

(iv) a vulnerable return address detector which detects an initial instruction for said attempting to convert.

22. The method of claim 8, wherein said attempting to disassemble is initiated at every offset within said at least one suspicious portion of data.

23. The method of claim 12, wherein said attempting to disassemble is initiated at every offset within said at least one suspicious portion of data.

24. The system of claim 17, wherein said attempting to disassemble is initiated at every offset within said at least one suspicious portion of data.

25. The apparatus of claim 20, wherein said attempting to convert is initiated at every offset within said at least one suspicious portion of data.

* * * * *